Jan. 17, 1961      H. O. BUZZELL      2,968,743

HEADLIGHT CONTROL SYSTEM FOR AUTOMOTIVE VEHICLES

Filed Aug. 7, 1959      2 Sheets-Sheet 1

INVENTOR.
Harold O. Buzzell
BY
Brown and Mikulka
ATTORNEYS

Jan. 17, 1961    H. O. BUZZELL    2,968,743
HEADLIGHT CONTROL SYSTEM FOR AUTOMOTIVE VEHICLES
Filed Aug. 7, 1959    2 Sheets-Sheet 2

INVENTOR.
Harold O. Buzzell
BY
Brown and Mikulka
ATTORNEYS

United States Patent Office 2,968,743
Patented Jan. 17, 1961

2,968,743

HEADLIGHT CONTROL SYSTEM FOR AUTOMOTIVE VEHICLES

Harold O. Buzzell, Wollaston, Mass., assignor to Polaroid Corporation, Cambridge, Mass., a corporation of Delaware Filed Aug. 7, 1959, Ser. No. 832,294
15 Claims. (Cl. 315—83)

The present invention relates to a headlight control system for vehicles providing improved driving and safety conditions with respect to those now existing, and more particularly to a system which utilizes polarized light for substantially eliminating headlight glare.

One of the problems in instituting such a light-polarizing, anti-glare headlight system in a given area, or on a national or international basis, is to insure, prior to complete adoption of the system, that the driver of an as yet unequipped vehicle shall not be blinded by the powerful, high, polarized beams from the headlights of an approaching car which is equipped under the system. This problem is overcome by the present invention in that it provides effective anti-glare headlight control which considers the unequipped as well as the equipped vehicle and thus eliminates the aforesaid danger of blinding the driver of a car in which components of the system have not yet been installed.

Basically, a light-polarizing headlight control system involves the installation of light-polarizing means in association with the headlights, a light-polarizing viewer visor, and some form of high-low beam control means for each vehicle. Bearing in mind that crossed polarizing axes of optically aligned plane polarizers produce a substantial degree of extinction of incident light and that other angular relationships of the axes produce varying degrees of diminution of incident light, the relative polarizing directions of the polarizing means of the headlights and the visor of mutually approaching vehicles are so chosen that the intensity of the high, polarized headlight beams from one vehicle are reduced to a proper low-level of visibility by the visor of the other vehicle and glare is thereby eliminated.

There are also other advantages accruing to the adoption of the system of the present invention in addition to those, above-mentioned, pertaining to a basic polarizing system and in addition to the special protection afforded by the present system to the driver of an unequipped vehicle. One such advantage is an improved operational sensitivity and accuracy as compared to previous light-polarizing systems. A second advantage is the provision of a greater ability to see through fog, smoke or haze. A third is that of making it possible to employ a high beam which is elevated even higher than that now used or than would be safe in present systems because of the glare factor. Use of the aforementioned higher beam would result in an improved range of road visibility, still without causing glare to the oncoming driver. Use of the word polarized herein is, in general, to be understood as applying to polarized light rather than in an electrical sense.

Having in mind the aforesaid considerations, a principal object of the invention is to provide a light-polarizing headlight control system or means for use within such a system which not only obliterates the hazard of headlight glare between any two mutually approaching vehicles equipped under the system, but which also protects the driver of a non-equipped vehicle by automatically switching the polarized high beam to low beam in response to non-polarized light from the headlights of the approaching, unequipped vehicle.

Other objects are to provide a light-polarizing headlight control system which is more sensitive and accurate than previous systems involving polarized light; to provide a system in which the high beam headlight means of an equipped vehicle are provided with light-polarizing means and in which the low beam headlight means are, in one modification, nonpolarized and in a second modification polarized; to provide a system of the character described wherein is made possible improved visibility in fog, haze, or smoke, as well as during normally clear environmental conditions; to provide a system which requires a minimum of rewiring or other alteration of the electrical system of an automotive vehicle; to provide a control device for a system as described, in which photoelectric cell means are employed in an automatic control electrical circuit or circuits and in which light-polarizing filter means are at least in part used therewith; and to provide a system of the character described in which predisposed relatively-differing polarizing directions of light-polarizing means may be employed.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
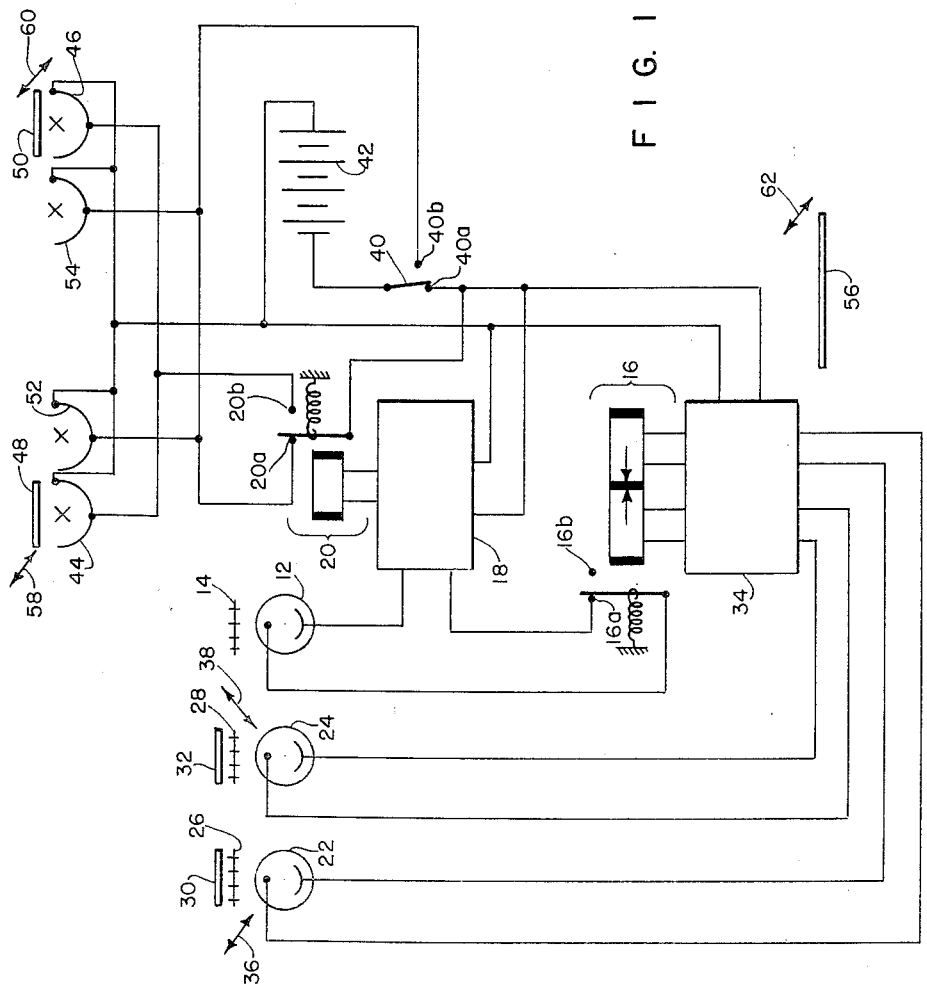
Figure 1 is a wiring diagram, partly schematic, of a headlight control installation of the invention.

Figure 1 illustrates one type of automatic headlight control device of the invention. It is to be assumed, in explaining the operation of the circuit, that each vehicle equipped under the system would include an installation such as that shown but that some vehicles will not as yet have been thus equipped. The device constitutes an extremely sensitive and accurate means for differentiating between, and selectively responding to, polarized and nonpolarized beams from the headlights of an approaching vehicle. Basically, it comprises first nonpolarized and second polarized photoelectric cell circuit means which cooperate with one another to properly switch the vehicle containing the installation to polarized high beam from nonpolarized low beam, and vice versa, or to correctly maintain either high or low beam during certain other driving conditions. Electronic components of the circuit are merely indicated diagrammatically or schematically, their actual structure or that of other components employed in their stead being subject to considerable variation as will be apparent to one skilled in the art.

The aforesaid first photoelectric cell circuit means comprises photoelectric cell 12, preferably having a "honeycomb" or "egg-crate" type of grid means 14 to control to some degree the angle of entering light rays, the armature and contacts of differential relay 16, power supply and amplifier means 18, and relay 20. The second photoelectric cell circuit means comprises photoelectric cells 22 and 24, having "egg-crate" grid means 26 and 28 and plane polarizing filters 30 and 32, respectively, in the path of incident light rays, power supply-amplifier means 34, and, in part, relay 16. The polarizing directions of filters 30 and 32 are approximately indicated by double-headed arrows 36 and 38, respectively, it being noted that they are disposed at acute angles to the vertical and substantially at 90° to one another.

Other elements of the device include manual override switch 40, battery 42, high-beam headlight means 44 and 46 having plane polarizing filters 48 and 50, respectively, low-beam headlight means 52 and 54 and light-polarizing visor 56. The double-headed arrows 58 and 60 indicate the approximate polarizing direction of the filters 48 and 50, respectively. Double-headed arrow 62 designates the approximate polarizing direction of the visor 56.

As indicated, when relay 20 is energized, the low-beam circuit is closed; when it is unenergized, the armature is spring-biased to provide closing of the high-beam circuit. The low-beam circuit is shown in operation in Fig. 1. When relay 16 is either unenergized or both coils thereof are equally energized or balanced, electromagnetically, the input from photoelectric cell means 12 to power supply-amplifier 18 is closed through contact 16a of the relay; when the coils of relay 16 are differentially energized or unbalanced electromagnetically, the input from photoelectric cell means 12 to power supply-amplifier 18 is broken.

Operation of the circuit of Fig. 1, under various driving conditions, will now be given.

(1) Urban driving: Unpolarized light (high or low beam from approaching unequipped vehicles, low beam of equipped vehicles, ambient light from street lamps, etc., as permitted by grid means 14, 26 and 28) actuates photoelectric cell 12 and both photoelectric cells 22 and 24, the latter two photocells being stimulated equally so as to generate current and produce balanced inputs to power supply-amplifier 34 and, thence, balanced energization of the coils of relay 16. Under this condition, the inherent spring-bias and adjustment of the armature of relay 16 is such as to provide the armature contact in closed relation with the relay contact 16a thus closing the circuit from photoelectric cell 12 to power supply-amplifier 18, the input current being amplified to energize the coil of relay 20. This causes its armature contact to strike contact 20a and close the circuit from battery 42 to low-beam headlight means 52 and 54. The low-beam circuit will remain closed as long as unpolarized light of sufficient intensity is incident on the photoelectric cells. The manual low-beam override or bypass switch 40, e.g., a foot-operated switch having automatic and low-beam positions 40a and 40b, respectively, permits placement and retention of the headlights on low beam, independently of the photoelectric cell actuated circuits, the latter being cut out or bypassed, as shown. It will be understood that suitable generator means, not shown, are provided for charging the battery. In case an approaching non-equipped vehicle failed to switch to low beam, in response to the equipped car's low beam, an additional manual switching means (not shown) connecting the lead from battery 42 to switch arm 40 with the lead to contact 20b would permit momentary use of the high beam of the equipped car to advise the driver of the approaching vehicle to dim his high beam.

(2) Rural driving (assuming no light from any source sufficient to actuate photoelectric cells 12, 22 and 24): The armature of relay 16 is at the 16a contact, namely, at its normal spring-biased position, and the coil of relay 20 is unenergized so that its armature springs toward contact 20b thus placing the headlights at high-polarized beam where they remain during this type of driving condition. It is to be understood that additional contacts may be provided at relay 20 bridging across the low and high beam contacts 20a and 20b at the high beam position of the armature whereby the unpolarized low beam may be switched on simultaneously with the high beam to produce both the polarized high beam and unpolarized low beam. This is consistent with a present-day arrangement wherein both low- and high-beam filaments are operative at high beam.

(3) Approaching nonequipped vehicle producing unpolarized light from its headlights (assuming previous condition No. 2, above): The sequence of operations previously described under condition No. 1, above, again occurs, the coil of relay 20 is energized, and the headlights are placed at low beam. It is to be understood that during rural driving conditions, an approaching vehicle, equipped under the system, would be operating on high-polarized beam and, therefore, unpolarized light would not be received from such a vehicle excepting possibly in some rare instance.

(4) Approaching polarized high beams of equipped vehicle. The oncoming polarized light passes through filter 32 but not through filter 30 thus producing an unbalanced input to power supply-amplifier 34. (a) (assuming headlights already at polarized high beam): The armature of relay 16 is moved into, or retained at, closed relation with contact 16, depending upon its previous condition thus breaking, or maintaining broken, the input circuit from photoelectric cell 12 to amplifier 18, deenergizing, or maintaining deenergized, the coil of relay 20, and retaining the armature of relay 20 at the polarized high-beam contact 20b. (b) (assuming headlights at low beam): The armature of relay 16 is moved into closed relation with the blank contact 16b thus breaking the input circuit from photoelectric cell 12 to amplifier 18, deenergizing the coil of relay 20, and placing or maintaining the armature of relay 20 at the polarized high-beam contact 20b.

Viewing visor 56 blocks the polarized high beams of approaching vehicles to an extent which renders them visible but devoid of glare. The possible and preferred polarizing directions of the various polarizing filters and the viewing visor will be discussed at greater length below.

Figure 2:
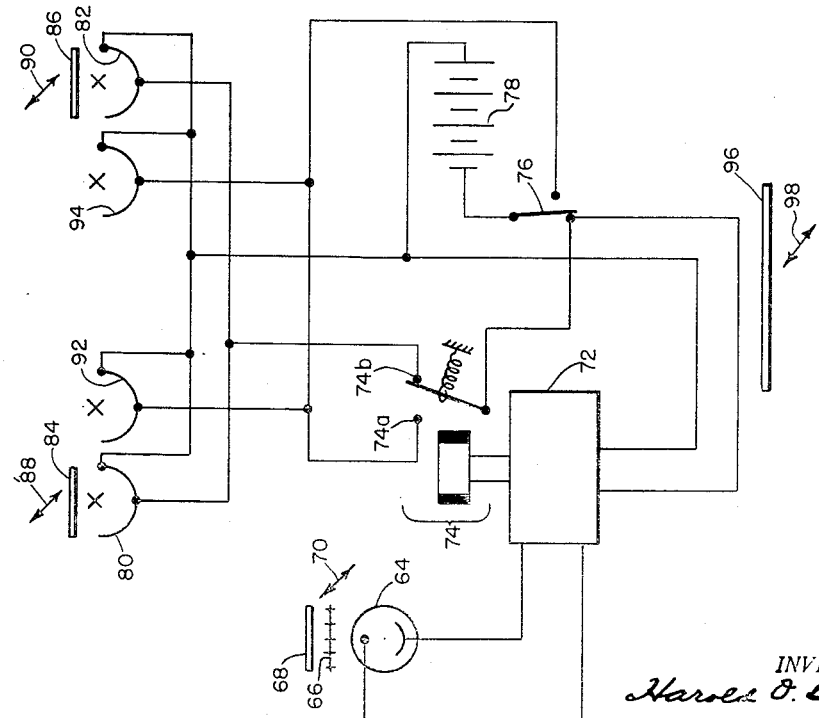
Fig. 2 is a wiring diagram, partly schematic, of a modified control installation of the invention.

The circuit illustrated in Fig. 2 is considerably simplified relative to that of Fig. 1. The advantages of lower cost and less bulk are in its favor and its responsivity, although probably less exact than that of the device of Fig. 1, is considered to be adequate for effective operation. The circuit operates somewhat similarly to that of Fig. 1 but energization of the switching relay for the low or high beams is controlled by a single photoelectric cell having a light-polarizing filter. The sensitivity of the photoelectric cell and the axial arrangement of the polarizing filter are such that substantially only unpolarized light from an approaching vehicle or other predetermined type of external source will actuate the photoelectric cell. The circuit comprises photoelectric cell 64, preferably having grid means 66 of a type previously described, plane polarizing filter 68 having a polarizing direction approximately indicated by double-headed arrow 70, power supply-amplifier means 72, relay 74, manual override switch 76, battery 78, high-beam headlight means 80 and 82 having plane polarizing filters 84 and 86, respectively, with polarizing directions approximately indicated by the double-headed arrows 88 and 90, low-beam headlight means 92 and 94, and light-polarizing visor 96 having a polarizing direction approximately designated by the double-headed arrow 98.

Operation of the installation of Fig. 2, under various driving conditions is as follows:

(1) Urban driving: Unpolarized light (high or low beam of approaching unequipped vehicles, low beam of equipped vehicles, ambient light from street lamps, etc., as permitted by element 66) actuates photocell 64 to provide a functional input to power supply-amplifier 72, which is amplified to energize the coil of relay 74. The armature of the relay then moves to the low-beam position at contact 74a thus closing the circuit from battery 78 to the low-beam headlights 92 and 94. The low-beam circuit remains closed as long as unpolarized light of sufficient intensity strikes the photo-cell. The manual low-beam override switch 76 is similar to that described relative to Fig. 1.

(2) Rural driving (assuming no light from any source sufficient to actuate the photoelectric cell): The coil of relay 74 is unenergized and the armature springs to the high-beam position of contact 74b thus placing the headlights at high-polarized beam.

(3) Approaching nonequipped vehicle producing unpolarized light from its headlights (assuming previous condition No. 2, above): The sequence of operations previously described under condition No. 1, above, again occurs, the coil of relay 74 being energized and the headlights placed at low beam.

(4) Approaching polarized high beams of equipped vehicle. The oncoming polarized light is blocked by filter 68 and photocell 64 will not be actuated. The armature of relay 74, being unenergized, will either remain at, or move to, the high-beam position of contact 74b, depending upon its previous position. The oncoming beams will be reduced in visible intensity by the viewing visor 96.

Figure 3:
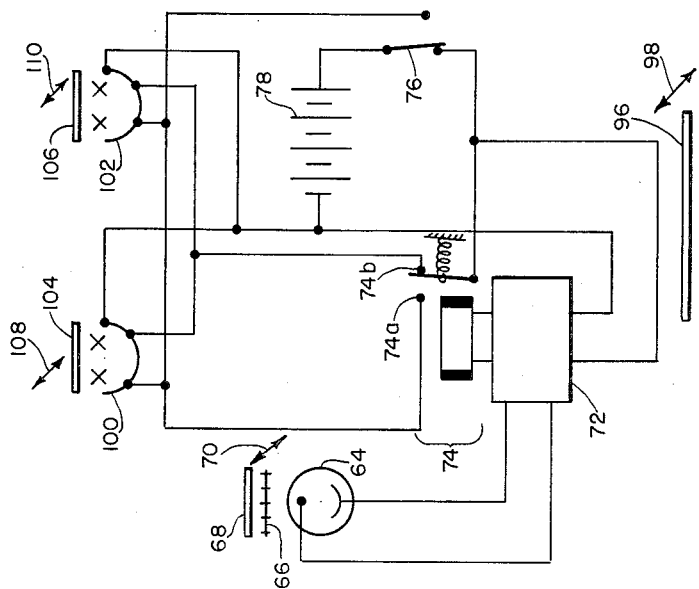
Fig. 3 is a wiring diagram, partly schematic, of a further modified control installation of the invention.

The circuit of Fig. 3 is generally similar to that of Fig. 2, the only elements which differ being the headlights 100 and 102 having both low- and high-beam filaments and light-polarizing filters 104 and 106, extending completely across the headlight means. The polarizing directions are indicated by the double-headed arrows 108 and 110. Operation is generally similar to that of the device of Fig. 2 excepting that both the high and low beams are polarized. Assuming the approach of a similarly equipped vehicle, the polarizing filter 68 would effectively block the passage of light of either the high or the low oncoming beams to photo-electric cell 64 and the armature of relay 74 would remain at, or would close to, the high-beam position, depending upon its previous state. This feature of a polarizer across both low and high beams is also adapted to an arrangement of headlights similar to that of current headlight systems wherein two pairs of headlights are employed, one pair of which includes both high- and low-beam filaments and the other pair high-beam filaments, only. In such an adaptation, both pairs of headlights would be provided with polarizing filters.

With reference to the directions of, and relation between, polarizing axes of the various filters, in Fig. 1 the directions 36, 58 and 60 are preferably identical and the direction 38 is preferably at 90° thereto. It will be apparent that the polarizing axis of light beams from the headlights of an approaching, and therefore oppositely moving vehicle which is similarly equipped will be reversed, and accordingly, crossed, namely, at an angle of 90° to the direction 36 but will be parallel to the direction 38. Accordingly, the oncoming polarized light will be effectively blocked from entering photoelectric cell 22 but will enter photoelectric cell 24 to unbalance the circuit in the manner previously described. While the directions 36 and 38 may, for example, be oppositely disposed at 45° to the horizontal, with the polarizing direction 62 of visor 56 also being disposed at 45° they may appropriately be at some other angle or angles, preferably between minus 20° to minus 45° relative to the vertical. Whatever the chosen angles, it will be apparent that any polarizing direction of an oncoming beam other than an exact vertical or an exact horizontal direction will permit passage of the beam preferentially into one of photocells 22 and 24 to the exclusion of the other and will serve to unbalance the circuit and cause its proper operation. A preferred angle for the headlight filters is at minus 55° to the vertical, in which instance the polarizing axis of the visor 56 is substantially at minus 35° to the vertical. This provides an effective relative orientation of polarizing axes of light from one's own headlights, and of light from approaching headlights, in conjunction with the polarizing direction of the visor for obtaining adequate visibility while eliminating the glare of approaching headlights. In this example, the axes of the photocell filters 30 and 32 would be at minus and plus 35°, respectively. The term "minus" refers to a polarizing axis displaced from the vertical in a counterclockwise direction; "plus" to a polarizing axis displaced from the vertical in a clockwise direction, both taken from the position of the driver, looking forwardly of one's own vehicle. A further discussion of possible angular relationships between polarizing axes of headlight filters and viewing visors is contained in U.S. Patent No. 2,458,179, granted to Edwin H. Land.

It has been found that crossing of the polarizing axis of the visor with that of one's own headlights facilitates penetration of fog. In this connection, it will be apparent that mounting means of a pivotal or ball-and-socket type may be provided for the visor which permit its being flipped over and reversed, or turned through 90°, or undergoing some combination of these movements to achieve the requisite crossed relation of axes. A "minus" system, characterized by the counterclockwise direction in which the polarizing axis of the viewing visor is displaced from the vertical, appears to be most satisfactory from the point of view of reducing internal reflections in, and permitting maximum transmission by, the present-day windshield which usually has an appreciable slope and rearward curve. Relative to the foregoing possible choices of angular disposition of polarizing axis or axes of the several filters or visor, for obtaining the foregoing advantages, it is understood that any of them may be employed in the devices and systems of the present invention as, for example, in the devices of Figs. 2 and 3, as well as in that of Fig. 1. Polarizing headlight systems are also known in which right-handed and left-handed circular polarization of headlight filter and viewing visor means, respectively, have been employed for diminution or substantial extinction of oncoming high beams. While plane polarizers have been shown herein as a preferred embodiment, circular polarizers are at least to some extent also adapted to use in the present invention, as will be apparent to one skilled in the art, and are thus considered to be within the scope thereof.

It is contemplated that any of the circuits of Figs. 1, 2 or 3 may readily be installed in a present-day automobile without any appreciable alteration of existing wiring and with only a very moderate amount of additional wiring, by mounting the amplifier and relay elements, wholly or in part, in a compact enclosure which, in turn, is installed above, or otherwise adjacent, the location of the present conventional high-low foot-switch. The photoelectric cell elements are mounted at any suitable location for proper light reception, e.g., near the left-hand support for the windshield, and have cable connections to the aforesaid casing. The present foot-switch would be removed and existing electrical connections to the headlights and battery would be employed to at least a considerable extent. A switch of the type of the conventional high-low foot-switch would be mounted at a convenient location on the aforesaid enclosure or at another suitable location for manual switching from automatic operation to fixed low-beam, or vice-versa. Alternatively, this switch could be mounted, for example, on the dashboard or steering post casing, or it could be operated by, or serve to provide, movement of the viewing visor, the latter being manually movable or power driven to and from functional position, as the case may be.

While the photoelectric cell means have been generally described as of the category of a photovoltaic type it will be understood that, alternatively, photoconductive means could be employed satisfactorily for the purpose, in which event the power supply-amplifier unit could be dispensed with. The grid for limiting the rays incident on a photocell may be dispensed with where restriction to certain rays is not of importance or is undesirable as, for example, when it is desired to maintain the headlights at low beam wherever there is an appreciable amount of unpolarized ambient light, such as may exist under city driving conditions.

Any suitable control means may be employed with the systems described herein to reduce the visible intensity of polarized high beams which may be projected from a vehicle located to the rear. One means comprises a rear view mirror having properly oriented polarizing and retardation layers, e.g., a ¼ wave plate and a plane polarizer superimposed on a reflecting surface. A second means comprises a polarizing layer overlaid on the reflecting surface of the mirror and a ½ wave plate incorporated with, or located adjacent the rear window. A third means comprises properly oriented polarizing and retardation layers adjacent the rear window which are either fixed at this location or movable into position to intercept the rays as, for example, by motor-driven or hydraulic means.

Although emphasis has been placed herein upon the advantage of the present system with respect to the driver of the as-yet-unequipped vehicle it will be appreciated that this might well be merely a passing phase because probably substantially all vehicles would ultimately be equipped under the system. Both prior to, and after, complete adoption of the system, the major advantages of glare-free, long-range headlights providing better visibility and driving safety under both normal and fog or haze conditions, would be achieved. The high degree of discrimination and responsivity between polarized and unpolarized light and the relative simplicity of the circuitry, characteristic of the present invention, is of distinct importance in providing a practicable, efficient system, at reasonable cost and having the foregoing advantages.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a headlight control system for automotive vehicles, in combination in a given vehicle equipped under said system, first headlight means for projecting an up-beam, second headlight means for projecting a down-beam, light-polarizing means positioned in the path of light rays emitted by at least said first headlight means, a source of electrical energy, photoelectric cell means mounted to receive light rays from a source external of said vehicle and constituting a component of an electrical switch actuating circuit, light-polarizing means substantially fixedly positioned in the path of at least part of any light rays which may be directed toward said photoelectric cell means from said external source, and electrical switching means comprising a first element included in said switch actuating circuit and operated by one of electric current changes and a termination of current flow, as provided by said photoelectric cell means in response to changes in external light conditions, and a second element responsive to said first element and controlling the selective supply of current from said source of electrical energy to said first and second headlight means.

2. In a headlight control system for automotive vehicles, in combination in a given vehicle equipped under said system, first headlight means for projecting an up-beam, second headlight means for projecting a down-beam, light-polarizing means substantially fixedly positioned in the path of light rays emitted by at least said first headlight means, a source of electrical energy, photoelectric cell means mounted to receive light rays from a source external of said vehicle and constituting a component of an electrical switch actuating circuit, light-polarizing means substantially fixedly positioned in the path of at least part of any light rays which may be directed toward said photoelectric cell means from said external source, and electrical switching means comprising a first element included in said switch actuating circuit and operated by one of electric current changes and a termination of current flow, as provided by said photoelectric cell means in response to changes in external light conditions, and a second element responsive to said first element and controlling the selective supply of current from said source of electrical energy to said first and second headlight means, and substantially integral light-polarizing viewing means which, at a functional position, is located substantially at eye-level of the driver of said vehicle so as to have, at one position, a polarizing direction similar to that of said first-named light-polarizing means and, at another position, a polarizing direction substantially at 90° thereto.

3. In a headlight anti-glare system for automotive vehicles, an automatic control device located in a vehicle equipped under said system comprising first headlight means for projecting an up-beam, second headlight means for projecting a down-beam, light-polarizing filter means substantially fixedly positioned in the path of light rays emitted by at least said first headlight means, a source of electrical energy, photoelectric cell means constituting a component of a switch actuating circuit mounted to receive light rays from a source external of said vehicle, light-polarizing filter means substantially fixedly positioned in the path of at least part of any light rays which may be transmitted toward said photoelectric cell means from said external source, electrical switching means comprising a first element included in said switch actuating circuit and operated by one of electric current changes and a termination of current flow, as may be provided by said photoelectric cell means in response to changes in external light conditions, and a second element responsive to said first element and controlling the selective supply of current from said source of electrical energy to said first and second headlight means, and a light-polarizing viewing visor positionable into and out of the field of vision of the operator of said vehicle so as to provide, when positioned in said field, a uniform polarizing direction of said visor throughout its area which is substantially similar to that of said first-named light-polarizing filter means.

4. A control device, as defined in claim 3, wherein said photoelectric cell means comprises a single photoelectric cell having an associated light-polarizing filter positioned in the path of light rays which may be transmitted thereto from said external source.

5. A control device, as defined in claim 3, wherein said photoelectric cell means comprises a single photoelectric cell free from association with light-polarizing filter means, and a pair of photoelectric cells each having an associated light-polarizing filter means in the path of external light rays transmitted toward said pair of photoelectric cell means.

6. A control device, as defined in claim 3, wherein said electrical switching means comprises a relay, said first element thereof constituting a coil energized by said switch actuating circuit, and said second element constituting the relay contacts.

7. A control device, as defined in claim 5, wherein said electrical switching means comprising a pair of relays, that relay in the circuit of said single photoelectric cell being a simple relay and that relay in the circuit of said pair of photoelectric cells being a differential relay, the contacts of said differential relay controlling the making and breaking of the circuit from said single photoelectric cell to the coil of said simple relay, and the contacts of the latter controlling the alternate switching of electric current from said source of electrical energy to said high- and low-beam headlight means.

8. A control device, as defined in claim 7, wherein amplifying means is included in said photoelectric cell circuits to provide amplified current for energizing the coils of said relays.

9. A control device, as defined in claim 3, wherein is additionally included a manually operable override switch for bypassing the automatic switching circuit thereof.

10. A control device, as defined in claim 3, wherein said headlight means comprises one pair of headlights, each headlight having dual filaments.

11. A control device, as defined in claim 3, wherein said headlight means comprises two pairs of headlights.

12. A control device, as defined in claim 3, wherein said light-polarizing filter means comprise plane polarizers having similar polarizing directions.

13. A control device, as defined in claim 5, wherein said light-polarizing filter means comprise plane polarizers having differential polarizing directions.

14. A control device, as defined in claim 5, wherein the polarizing axes of said filter means associated with said pair of photoelectric cells are respectively oppositely disposed substantially at minus 35° and substantially plus 35° relative to the vertical, and wherein the polarizing axis of said filter means positioned in the path of light rays emitted by said first headlight means is disposed substantially at minus 55° relative to the vertical.

15. In a headlight control system for automotive vehicles, in combination in a given vehicle equipped under said system, light-projecting means comprising means providing an up-beam and a down-beam, means for actuating said beam providing means to obtain said up-beam and said down-beam, light-polarizing means substantially fixedly positioned in the path of at least said up-beam, a source of electrical energy, photoelectric cell means mounted to receive light rays from a source external of said vehicle and constituting a component of an electrical circuit for operating said actuating means, and substantially uniformly polarizing and fixedly positioned light-polarizing means contiguous said photoelectric cell means and positioned in the path of at least part of any light rays which may be directed toward said photoelectric cell means from said external source, said actuating means being energized by one of electric current changes and a termination of current flow instigated by said photoelectric cell means in response to changes in external light conditions.

References Cited in the file of this patent

UNITED STATES PATENTS

| | | |
|---|---|---|
| 2,188,293 | Williams | Jan. 23, 1940 |
| 2,230,262 | Pollack | Feb. 4, 1941 |
| 2,807,752 | McIlvaine | Sept. 24, 1957 |